United States Patent [19]

Schwab

[11] 4,316,692
[45] Feb. 23, 1982

[54] SPREADING DEVICE FOR LAMINATION STACKS

[75] Inventor: Rolf Schwab, Bischofsheim, Fed. Rep. of Germany

[73] Assignee: Siemens Aktiengesellschaft, Munich, Fed. Rep. of Germany

[21] Appl. No.: 57,019

[22] Filed: Jul. 12, 1979

[30] Foreign Application Priority Data

Jul. 21, 1978 [DE] Fed. Rep. of Germany ....... 2832123

[51] Int. Cl.³ .............................................. B65H 9/10
[52] U.S. Cl. ........................................ 414/27; 29/738;
294/94; 414/28; 414/908
[58] Field of Search ................... 414/28, 27, 35, 36,
414/908, 754, 783, 787; 294/93, 94, 96, 88;
29/738; 279/2

[56] References Cited

U.S. PATENT DOCUMENTS

| 3,513,527 | 5/1970 | Hoy ..................................... 29/738 X |
| 3,758,146 | 9/1973 | Kaercher, Jr. ......................... 294/94 |
| 3,829,147 | 8/1974 | Ryswick ................................ 294/93 |
| 3,926,320 | 12/1975 | Shively et al. ..................... 29/738 X |

FOREIGN PATENT DOCUMENTS 1273170 8/1961 France .................................. 294/93

OTHER PUBLICATIONS

Publication, "Vorrichtungs—bau" (Equipment Construction), by Bussin, second edition, 1920, published by Krayn in Berlin, p. 106, Fig. 133.

Primary Examiner—Leslie J. Paperner
Attorney, Agent, or Firm—Kenyon & Kenyon

[57] ABSTRACT

A spreading device for use in quantity production of lamination stacks for electric machines has sector pieces, which fit into the bore hole of the lamination stack and are placed on a spreading mandrel. The mandrel can be moved axially by a hydraulic drive. The end faces of the sector pieces are beveled on their insides and rest against a first conical surface connected to the spreading mandrel and against a second conical surface opposite to and facing the former. To achieve uniform alignment of the lamination stack over its full length, the second conical surface is displaced by a hydraulic drive and the two conical surfaces are moved towards each other by the same amount.

3 Claims, 1 Drawing Figure

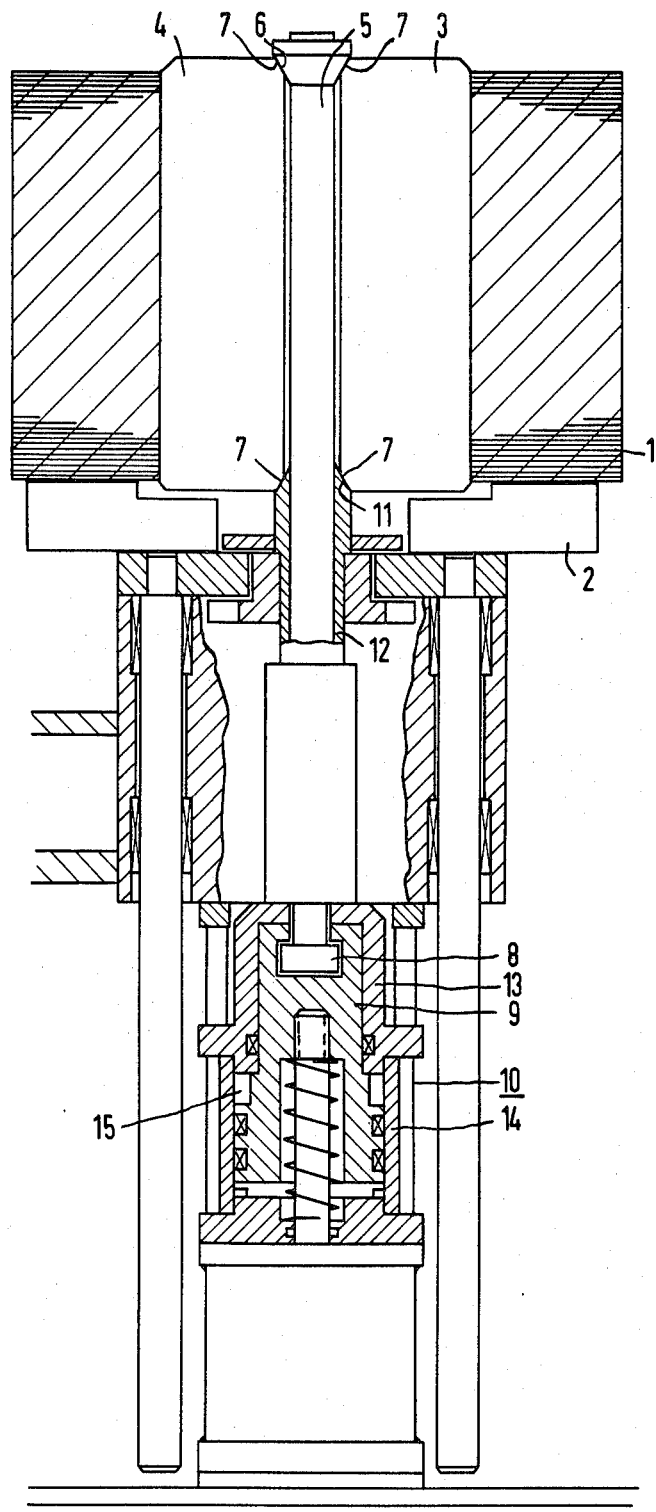

SPREADING DEVICE FOR LAMINATION STACKS

BACKGROUND OF THE INVENTION

1. Field of the Invention

This invention relates to a spreading device for stacks of laminations of electric machines, in which a spreading mandrel, which can be axially displaced by a hydraulic drive, receives sector pieces which fit into the hole of the lamination stack. The sector pieces have beveled faces on their inside edges which rest against a first conical surface connected to the spreading mandrel and a movable second conical surface facing the first one.

2. Description of the Prior Art

In one, existing, spreading device the second conical surface is stationary. In this structure, the danger exists that the sector pieces will not slide on this stationary conical surface by the same amount as they will on the conical surface which moves axially with the spreading mandrel. This results in a non-uniform alignment of the lamination stack. In addition, the sector pieces are displaced, in this spreading device, in the axial direction of the spreading mandrel. In order to avoid axial motion between the sector pieces and the lamination stack, the lamination stack must be supported by an axially movable support.

It is an object of the invention to provide a spreading device which operates so that the lamination stack is aligned uniformly over its entire length and there is no axial motion of the lamination stack.

SUMMARY OF THE INVENTION

This problem is solved in a spreading device of the type described above by providing for movement of the second conical surface by a hydraulic drive, so that both conical surfaces are moved toward each other by the same distance. By moving both conical surfaces the same amount, the sector pieces are urged radially outward by the same amount at both ends. Thereby, the lamination stack is also aligned uniformly over its full length.

It has been found to be particularly advantageous to actuate both the second conical surface and the spreading mandrel which moves the first conical surface by the same hydraulic drive. According to a further feature of the invention, perfectly uniform displacement of the two conical surfaces is obtained without special control means by arranging for oppositely directed motion of a first piston, coupled to the spreading mandrel, and a second piston, coupled to the second conical surface, in a common piston chamber, and by admitting the hydraulic medium into the piston chamber between the two pistons.

BRIEF DESCRIPTION OF THE DRAWING

The sole FIGURE shows, in partial cross-section, a view of a lamination spreader in accordance with the teachings of the invention.

DETAILED DESCRIPTION OF THE INVENTION

In the spreading device shown, a lamination stack 1 rests on a support ring 2 which is carried on a support surface of the spreading device. Sector pieces 3 and 4, which are placed on a spreading mandrel 5, are disposed in the bore hole of lamination stack 1. A first conical surface 6 is formed on the upper end of spreading mandrel 5, and rests against one bevel 7 of sector pieces 3 and 4. The lower end 8 of spreading mandrel 5 is coupled to a first piston 9 of a hydraulic drive 10. A second conical surface 11 is provided opposite to, and facing, first conical surface 6, and against which sector pieces 3 and 4 are seated on another bevel 7. The second conical surface 11 is carried on a hollow rod 12 which surrounds spreading mandrel 5. Hollow rod 12 rests on the end face of a second piston 13. The two pistons 9 and 13 are arranged in a common piston chamber formed by a cylindrical tube 14. An annular space 15 is formed between the two pistons 9 and 13 and the hydraulic medium is admitted to it. Thus, the hydraulic medium acts uniformly on the two pistons 9 and 13.

The spreading device operates as follows. After a lamination stack 1 has been placed over sector pieces 3 and 4, the flow of hydraulic medium into annular space 15 is released. The hydraulic medium pushes first piston 9 down and second piston 13 up. Accordingly, first piston 9 pulls the spreading mandrel downward and the second piston 13 pushes the hollow rod 12 upward. First conical surface 6 and second conical surface 11 then slide on bevels 7 of segments 3 and 4 and push the segments radially outward. The hydraulic medium admitted to annular space 15 displaces pistons 9 and 13 by the same amount. This assures that segments 3 and 4 are also displaced the same amount, in the radial direction, by the first and the second conical surface 6 and 11. Lamination stack 1 is therefore aligned uniformly over its entire length.

Since the two pistons 9 and 13 have the same travel distance, segments 3 and 4 keep their position in the axial direction. Lamination stack 1 is therefore supported by the stationary support ring 2.

What is claimed is:

1. A spreading device for insertion into a hole in a stack of laminations to align the stack for use in an electric machine comprising:
   a ring for supporting said stack of laminations;
   a mandrel passing through the ring and adapted to pass through said hole in the lamination stack supported on the ring, the mandrel adapted to be displaced axially relative to the ring;
   a first conical surface connected to the mandrel;
   a second conical surface facing the first conical surface and adapted to be displaced towards the first conical surface;
   sector pieces, adapted to fit into the hole of the lamination stack and to contact the lamination stack, each sector piece having end faces and each end face carrying a bevel for engaging one of the conical surfaces; and
   a hydraulic drive coupled to the mandrel and to the second conical surface for axially displacing the conical surfaces towards each other by the same amount, whereby the sector pieces are forced outward to align the laminations in the stack.

2. A spreading device according to claim 1 in which the hydraulic drive is common to both the spreading mandrel having the first conical surface and the second conical surface.

3. A spreading device according to claim 1 in which the hydraulic drive comprises:
   a first piston coupled to the spreading mandrel and a second piston coupled to the second conical surface, both pistons being arranged in the same piston chamber; and
   means for admitting hydraulic medium to the piston chamber between the two pistons.

* * * * *